May 30, 1950     H. S. GRAY     2,509,818
DUST PROTECTED SCREW
Filed Feb. 2, 1948

INVENTOR.
Harold S. Gray
BY
ATTORNEYS.

Patented May 30, 1950

2,509,818

UNITED STATES PATENT OFFICE 2,509,818

DUST PROTECTED SCREW

Harold S. Gray, Troy, N. Y., assignor to W. & L. E. Gurley, Troy, N. Y., a corporation of New York Application February 2, 1948, Serial No. 5,699

4 Claims. (Cl. 248—180)

This invention relates to adjusting screws for the leveling heads and other parts of surveying instruments and particularly to means for protecting such screws from dust and moisture.

For more than sixty years the screws of micrometer calipers have been protected from dust and mechanical injury by constructing the knurled adjusting head as a graduated fixedly mounted sleeve which telescopes over the stem of the caliper. This construction has since been used to protect screws used for a number of purposes, but requires rather expensive machining operations. There is need for some simpler and less expensive arrangement, and particularly one which can be applied to existing mechanisms without requiring great changes of design.

The present invention affords a sleeve which telescopes into or around a part into which the screw is threaded and is formed independently of the screw and so mounted that it is self-aligning. To attain these results the sleeve is constructed with an internal flange at one end. This flange is internally threaded to fit threads on the screw to be protected. The screw has an annular recess or "gain" at the end of its threads, and the sleeve is screwed into the screw until its flange reaches and enters the gain. An annular gasket of rubber-like material dimensioned to fit the gain is slipped over the screw, between it and the sleeve until the gasket also enters the gain. Then the gasket seals the joint between the screw and the sleeve, acts as a retainer and leaves the sleeve free to aline itself relatively to the screw.

An embodiment of the invention in a leveling screw will now be described as a basis for disclosure of the principles of the invention.

In the accompanying drawing—

The general construction of the leveling head is illustrated as conforming to the patent to Arms 1,779,080, October 21, 1930.

Figure 1:
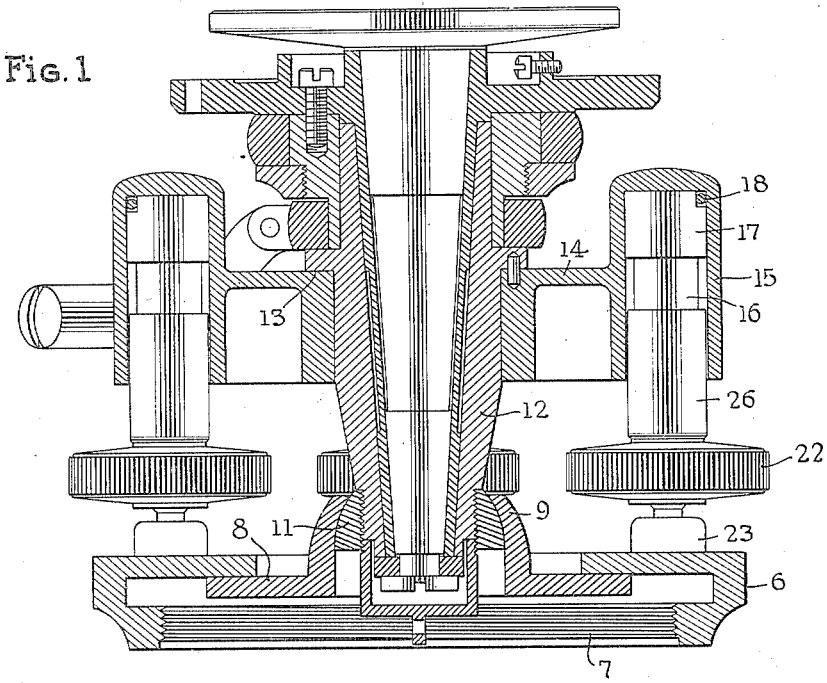
Fig. 1 is a vertical axial section of a leveling head equipped with the invention.
Figure 2:
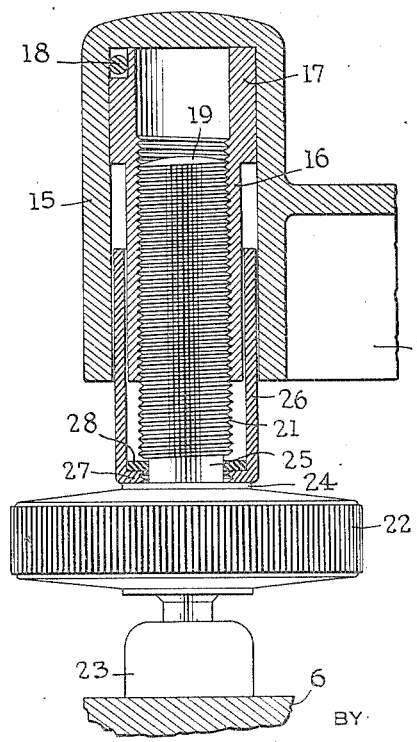
Fig. 2 is an axial section through one of the leveling screws, drawn on a larger scale.

In Fig. 1 the base plate is indicated at 6 and is threaded at 7 to engage the tripod head. A shiftable centering plate 8 carries the socket 9 for the ball nut 11. Nut 11 is screwed onto the lower end of the bearing shell 12. A flange 13 on the shell engages the spider 14, the shell passing through an opening in the center of the spider. The leveling screw assemblies which are the subject of the present invention are mounted in cylindrical sockets 15, each open at its bottom and closed at its top, each socket being located at the end of a corresponding arm of the spider.

Since all four leveling screw assemblies are identical a description of one will suffice.

An internally threaded sleeve 16 is formed at its upper end with an enlarged cylindrical head 17 which makes a close push fit with the bore of the socket and seats against the upper closed end of the socket. Below the head 17 the external diameter of the sleeve is reduced so as to be less than the diameter of the bore. Thus an annular recess is afforded. Any conformation of the parts which would assure rigid positioning of the sleeve and afford the desired annular recess could be substituted. A tangent pin 18 is fixed in the socket and engages a notch or key-way formed near the top of head 17, so as to prevent rotation of the sleeve in the socket. The parts are closely fitted so that the sleeve is rigidly mounted.

The leveling screw 19 has threads 21 which fit the internal threads of sleeve 17. The screw carries a knurled adjusting knob 22, and has at its lower end a thrust piece 23 connected to the screw by a joint permitting universal tilt within reasonable limits. Since the construction of the joint is familiar and is illustrated in the Arms patent it is not illustrated in detail. The thrust piece engages the plate 6, as shown in Fig. 1.

At the upper side of knob 22 is a flange or shoulder 24 and between this and the threads 21 is a gain or groove 25 somewhat deeper than the roots of threads 21. The thread protector is a sleeve 26 having an inturned flange 27 at its lower end. The inner margin of flange 27 is threaded to fit threads 21.

Since the threads in flange 27 fit the threads 21, the protector can be mounted by screwing it onto the screw until the flange 27 reaches the gain 25. It is there held close to flange 24 by a resilient gasket 28 of synthetic rubber or like material which is inserted between the sleeve 26 and the screw. This gasket seats in the gain 25 and acts both as a seal and as a retainer. The sleeve 26 makes a free fit with the bore of socket 15 and with the exterior of sleeve 16. Either telescopic fit thus formed would afford good dust protection, and the two together act cumulatively.

The construction has the advantage that the leveling screw assemblies are complete removable units. Their use requires very little change from basic designs heretofore standard. The sleeves 26 are self-aligning and require no difficult or unusually precise machining operations.

The protector is adaptable to other types of adjusting screw used in engineering and like instruments, and can be modified in detail to suit particular uses. Thus while the invention has particular utility in the environment illustrated, it is not limited thereto.

What is claimed is:

1. A dust-protected screw assembly comprising an internally threaded sleeve; an externally threaded screw working in said sleeve and having a knob by which it may be turned and a reduced, unthreaded portion between the knob and the threaded portion of the screw; and a protector sleeve dimensioned to telescope over the internally threaded sleeve and having an inturned flange loosely confined in the groove formed by said reduced unthreaded portion.

2. A dust-protected screw assembly comprising an internally threaded sleeve; an externally threaded screw working in said sleeve and having a knob by which it may be turned and a reduced, unthreaded portion between the knob and the threaded portion of the screw; a protector sleeve dimensioned to telescope over the internally threaded sleeve and having an inturned flange loosely confined in the groove formed by said reduced unthreaded portion said flange being internally threaded to fit the threads on said screw; and a rubber-like annular gasket mounted against said flange and closely encircling said unthreaded portion.

3. A dust-protected screw assembly comprising a member having a cylindrical socket closed at one end and open at the other; an internally threaded sleeve, closely fitting the closed end of said socket, and spaced from the socket for a substantial distance from the open end of the socket, whereby an annular clearance is afforded around said sleeve; means for fixing said sleeve against rotation in the socket; an externally threaded screw working in said sleeve and having a knob by which it may be turned and a reduced unthreaded portion between the knob and the threaded portion of the screw; and a protector sleeve dimensioned to enter said annular clearance and to telescope into said socket and around said threaded sleeve, said protector sleeve having an inturned flange loosely confined in the groove formed by said reduced unthreaded portion.

4. A dust-protected screw assembly comprising a member having a cylindrical socket closed at one end and open at the other; an internally threaded sleeve, closely fitting the closed end of said socket, and spaced from the socket for a substantial distance from the open end of the socket, whereby an annular clearance is afforded around said sleeve; means for fixing said sleeve against rotation in the socket; an externally threaded screw working in said sleeve and having a knob by which it may be turned and a reduced unthreaded portion between the knob and the threaded portion of the screw; a protector sleeve dimensioned to enter said annular clearance and to telescope into said socket and around said threaded sleeve, said protector sleeve having an inturned flange loosely confined in the groove formed by said reduced unthreaded portion; and a rubber-like annular gasket mounted against said flange and closely encircling said unthreaded portion.

HAROLD S. GRAY.

REFERENCES CITED

The following references are of record in the file of this patent:

UNITED STATES PATENTS

| Number | Name | Date |
| --- | --- | --- |
| 891,340 | Huff | June 23, 1908 |
| 1,484,350 | Cusick | Feb. 19, 1924 |
| 2,248,209 | Vacquier et al. | July 8, 1941 |
| 2,438,479 | Patrosio et al. | Mar. 23, 1948 |
| 2,440,211 | Rothweiler | Apr. 20, 1948 |